UNITED STATES PATENT OFFICE.

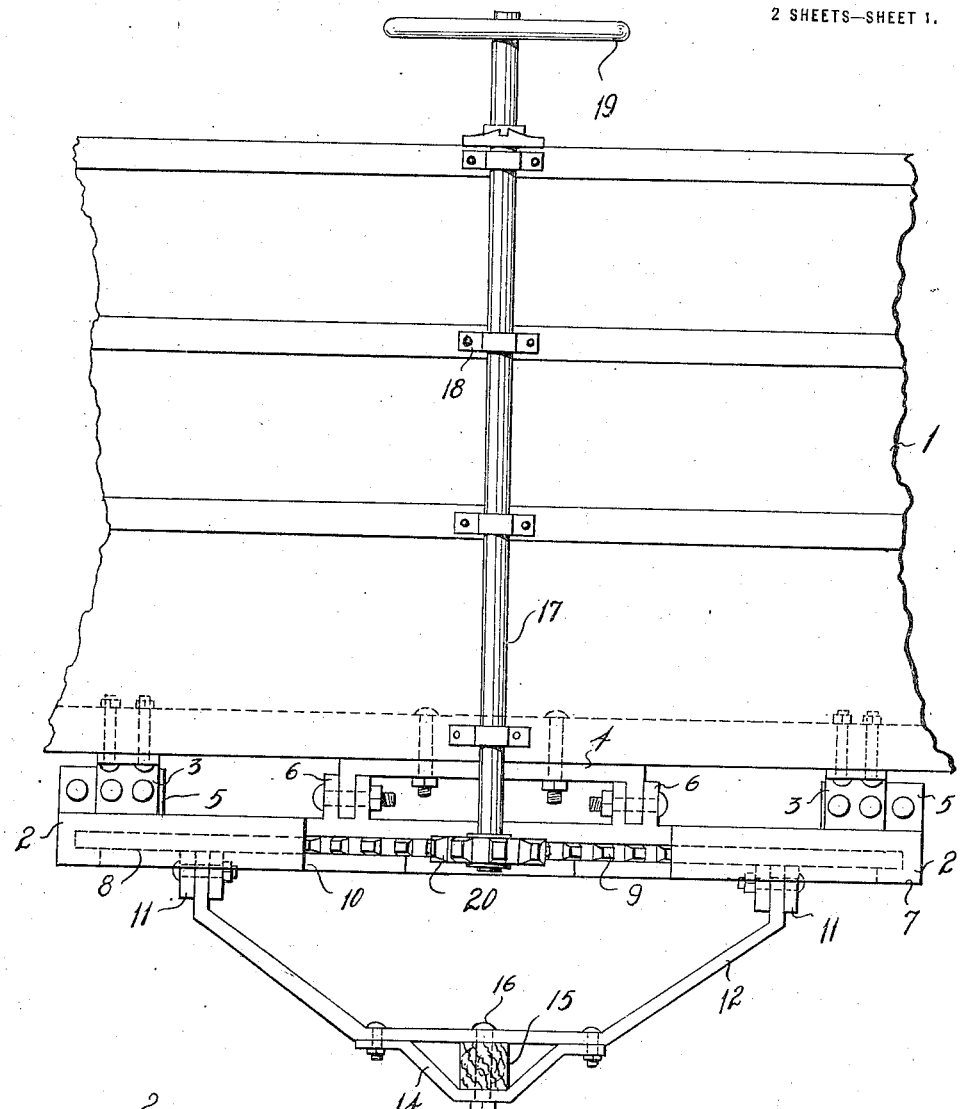

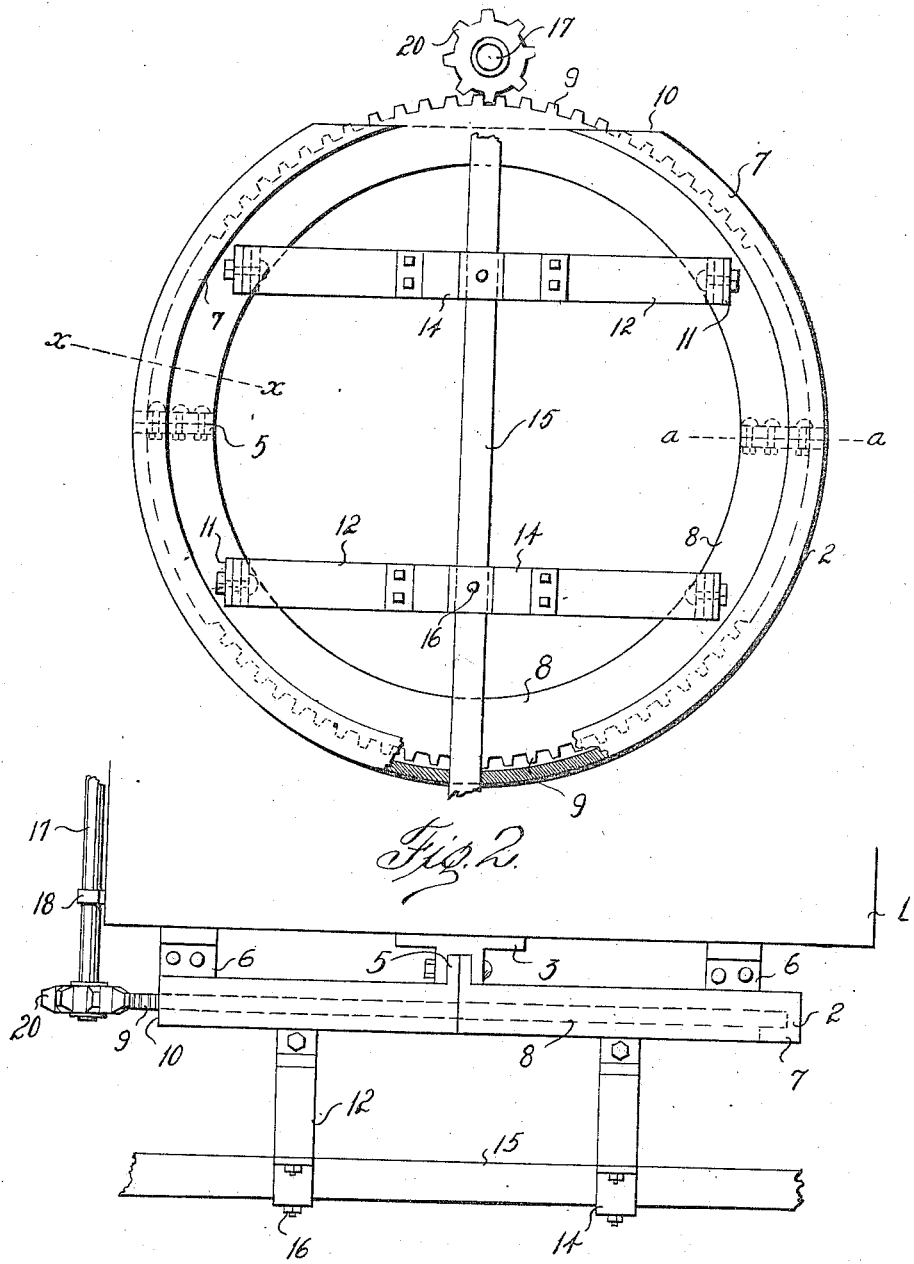

CHARLES P. MOORE, OF GARLAND, TEXAS, ASSIGNOR OF ONE-SIXTH TO J. F. WHITE, ONE-SIXTH TO CHAS. D. FLOOK, ONE-SIXTH TO WILLIAM A. HOLFORD, ONE-SIXTH TO H. J. CASTLE, AND ONE-SIXTH TO H. WALTER JONES, ALL OF GARLAND, TEXAS.

TRUCK-GEAR FOR VEHICLES.

1,160,941. Specification of Letters Patent. Patented Nov. 16, 1915.

Application filed May 5, 1913. Serial No. 765,618.

*To all whom it may concern:*

Be it known that I, CHARLES P. MOORE, a citizen of the United States, residing at Garland, in the county of Dallas and State of Texas, have invented certain new and useful Improvements in Truck-Gears for Vehicles, of which the following is a specification.

This invention as specified, relates to new and useful improvements in truck gears for vehicles.

The object of the invention is to provide a turning gear for the rear truck of long bodied vehicles involving certain superior features of construction and arranged so that the turning of the truck may be effected from the top of the vehicle.

A still further object of the invention is to provide a device of the character described that will be strong, durable, efficient and simple and comparatively inexpensive to construct, also one in which the several parts will not be likely to get out of working order.

With the above and other objects in view, the invention has relation to certain novel features of the construction and operation, an example of which is described in the following specification and illustrated in the accompanying drawing, wherein:

Figure 1 is a partial side elevation of a thresher showing the invention applied thereto, Fig. 2 is an under side view of the turning gear, Fig. 3 is a rear elevation of the parts shown in Fig. 1, Fig. 4 is a transverse sectional view on the line *x—x* of Fig. 2, and Fig. 5 is a transverse sectional view on the line *a—a* of Fig. 2.

In the drawings the numeral 1 designates a portion of a thresher. An annular gear ring casing 2 is suspended under the bottom of the thresher by brackets 3 and inverted yokes 4 engaging lugs 5 and 6 respectively projecting upward from the casing. The casing is made in two semi-circular sections which are joined by the lugs 5. The lugs 5 are received between the brackets 3, and the parts fastened together by suitable nuts and bolts. The ends of the yokes 4 are received between the lugs 6 and in the parts fastened together by suitable nuts and bolts.

As best shown in Figs. 4 and 5, the annular casing 2 is L-shaped and has an under hanging shoulder 7 on which a gear ring 8 is supported to rotate. The ring is confined in the casing and has its inner periphery substantially flush with the inner periphery of the casing. At opposite diametrical portions, the gear ring has gear teeth 9 and at one side of the thresher the casing has a portion 10 cut away to expose one of the toothed portions of the ring. By providing two sets of teeth the ring may be reversed when one set of teeth become worn.

At diametrically opposite points, pairs of lugs 11 depend from the under side of the ring 8 and receive the upper ends of angular inverted arch bars 12. The parts are so disposed that the arch bars are normally longitudinal of the thresher. To the central portion of each bar 12 a hanger 14 is fastened. An axle 15 supporting the bars 12 is fastened in each hanger 14 by a bolt 16 as shown in Figs. 1 and 3.

A vertical shaft or post 17 is mounted in brackets 18 on the side of the thresher and carries a hand wheel 19 at its upper end. On the lower end of the shaft a pinion 20 is fixed so as to mesh with the teeth 9 of the gear ring 8. By rotating the shaft it is obvious that the ring 8 is rotated and the truck being secured to the ring will be thus turned.

Many times when it is desired to drive or haul a long bodied vehicle like a thresher from a road into a narrow lane at right angles to the road, it is difficult to make the turn where the rear trucks are stationary. In employing this invention such turns can easily be negotiated by turning the rear truck by means of the hand wheel 19. Very sharp turns at various angles may be readily made with this equipment.

What I claim is:

1. In a device of the character described, the combination with the axle and a truck and a gear ring supported by said axle, of a casing divided diametrically into two semi-circular sections depending from the body of said truck, each section of the casing being provided with an annular vertical wall disposed adjacent to the periphery of the gear ring, an underhanging annular shoulder formed integrally with and projecting horizontally from the lower portion of said wall and an overreaching annular shoulder substantially co-extensive with said gear ring, and integrally formed with and projecting horizontally from the upper portion of said wall, to thereby inclose and support the gear ring.

2. In a device of the character described the combination with an axle and a truck, of inverted arch bars supported by said axle, a gear ring supported by said arch bars, lugs depending from said gear ring and connecting said gear ring with said arch bars, inverted yokes and brackets depending from said truck, a box-like structure inclosing said gear ring, said box-like structure consisting of two similar semi-circular portions, each portion having a substantially vertical wall and underhanging and overreaching flanges supporting and inclosing said gear ring and lugs extending upwardly from said casing and connecting the same to said inverted yokes and brackets.

In testimony whereof I have signed my name to this specification in the presence of two subscribing witnesses.

CHARLES P. MOORE.

Witnesses:
G. W. CROSSMAN,
J. L. ISOM.

Copies of this patent may be obtained for five cents each, by addressing the "Commissioner of Patents, Washington, D. C."